United States Patent
Strait (10) Patent No.: US 7,052,734 B2
(45) Date of Patent: May 30, 2006

(54) INTEGRAL PIGMENTS IN COMPOSITE SURFACES

(75) Inventor: Jared Strait, Sterling Heights, MI (US)

(73) Assignee: General Dynamics Land Systems Inc., Sterling Heights, MI (US)

(*) Notice: Subject to any disclaimer, the term of this patent is extended or adjusted under 35 U.S.C. 154(b) by 0 days.

(21) Appl. No.: 10/669,629

(22) Filed: Sep. 25, 2003

(65) Prior Publication Data

US 2005/0069712 A1    Mar. 31, 2005

(51) Int. Cl.
*B05D 1/12*    (2006.01)
(52) U.S. Cl. .................. 427/203; 427/162; 427/185
(58) Field of Classification Search ........... 427/459, 427/475, 482, 162, 185, 204, 205, 356, 203; 164/97, 98
See application file for complete search history.

(56) References Cited

U.S. PATENT DOCUMENTS

| | | | | |
|---|---|---|---|---|
| 3,769,126 A | * | 10/1973 | Kolek | 156/172 |
| 5,851,450 A | * | 12/1998 | Rennie et al. | 264/1.28 |
| 6,498,883 B1 | * | 12/2002 | Wilson | 385/114 |
| 6,559,197 B1 | * | 5/2003 | Fewkes et al. | 522/172 |

* cited by examiner

*Primary Examiner*—Fred J. Parker
(74) *Attorney, Agent, or Firm*—Michael J. Bell; Howrey LLP (57) ABSTRACT

The invention includes methods for imparting spectral characteristics to composite materials by coating prepreg or dry reinforcement materials with pigment, then processing the prepreg or dry reinforcement materials using conventional composite processing methods. The resulting composite material products are lightweight and have durable treatments. The invention further includes composite materials with spectral characteristics imparted by the methods of the invention.

16 Claims, 9 Drawing Sheets

INTEGRAL PIGMENTS IN COMPOSITE SURFACES

FIELD OF THE INVENTION

The invention relates to methods for imparting spectral characteristics to composite surfaces and to composites materials treated using these methods.

BACKGROUND

Composite materials, or composites, are used in a wide variety of products. Composites are characterized by two or more distinguishable materials combined in a way that typically imparts a favorable strength to weight ratio. The constituents of composites include reinforcement materials and matrix materials. Reinforcement materials are usually stronger and more rigid than matrix materials, and provide strength and stiffness to the composite. Reinforcement materials can include particulates, whiskers (short fibers), or continuous fibers made from glass, metals, polymers, ceramics, or graphite, for example. The matrix material binds the reinforcement material and provides structure to the composite. Matrix materials include, for example, polymeric thermoset resins, such as polyester or epoxy resins, metals, or ceramics.

It is often desirable to impart spectral characteristics (e.g. color, gloss, reflectivity, absorption and/or emission of ultraviolet, visual, infrared, and/or radar frequency energy) to composite articles of manufacture. One method of imparting visual color is to simply paint a composite product, or to otherwise add a coloring layer to the composite. For example, U.S. Pat. No. 4,599,212 describes a resin useful as a gel-coat for composites that can be mixed with visual pigments to impart color. But gel-coat coloring composite products adds weight, manufacturing time, and cost to the products, and the coatings are often not as durable as may be required for many applications.

One approach to overcoming the weight and fragility problems of colored composites is set forth in U.S. Pat. No. 6,004,900, which recites a method including the step of forming a composite article using a resin mixture that includes a pigment. The pigment-containing resin hardens to form a pigmented matrix that has a durable color without adding significant weight to the composite. However, much of the pigment used in this method is unnecessary because it is distributed throughout the matrix, whereas only the outermost surface of the matrix is visible. This is undesirable because pigments are often costly, and so the amount of pigment used to impart desired spectral characteristics would preferably be minimized. Furthermore, pigment particles embedded throughout the matrix may compromise the strength of the composite.

Others have had some success applying only a layer of particles to the outer surface of composite materials. For example, in U.S. Pat. No. 5,091,234, there is a recitation of a method in which a layer of particles is deposited on an adhesive layer on a composite. However, these methods do not produce coatings that are sufficiently durable for many applications, and the adhesive layers can add significant additional weight and manufacturing cost to the final composite article.

There is thus a need in the art for a method of imparting spectral characteristics to composite products such that the treatment is durable and does not impart significant weight to the products, that need not use significantly more pigment than is necessary to impart one or more desired spectral characteristics, and that does not significantly increase the manufacturing cost of the product.

SUMMARY OF THE INVENTION

It is therefore an object of the invention to provide methods for integrating pigments onto composite surfaces to impart a durable pigmentation without imparting significant additional weight or requiring the use of significantly more pigment than is necessary to provide a desired spectral characteristic. It is a further object of the invention to provide composite products with integrated pigments produced by the methods. The methods of the invention provide durable pigmentation to composite surfaces while eliminating the need for an exterior pigmented coating by imbedding active pigments directly into the surface of a composite such as a fiber reinforced composite laminate. The methods allows the creation of materials with spectral characteristics that can be controlled by the pigments, which benefit from a portion of the environmental, chemical, and physical durability of the composite matrix material. While the methods described herein are particularly suited for articles manufactured from composite materials, they may also be successfully applied to articles manufactured from other materials such as plastics and molded curable resins without reinforcement.

In one embodiment, the invention includes a method for imparting a spectral characteristic to a composite material, comprising the steps of providing a reinforcement material, coating the reinforcement material with pigment particles to produce a pigment coated reinforcement material, wherein the pigment particles impart the spectral characteristic, applying a resin material to the pigment coated reinforcement material, and curing the resin material to form the finished composite material comprising a matrix that binds the reinforcement material, wherein the matrix material provides durability to the pigment particles coating the reinforcement material. A fluidized bed of the pigment particles may be used in the step of coating the reinforcement material with pigment particles. A textured tool surface may be applied to the pigment coated reinforcement material. The finished composite material may be sanded. Reinforcement materials include glass, carbon, organic fiber material made from poly-paraphenylene terephthalamide sold by DuPont® under the trade name Kevlar®, and organic fiber material made from from polyethylene sold by Honeywell® under the trade name Spectra®, among others. Pigments include metal flakes, inks, dyes, and pigment-coated microspheres, among others. Resins include vinyl ester resins and epoxy resins, among others.

In another embodiment, the invention includes a method for imparting a spectral characteristic to a composite material, comprising the steps of providing a reinforcement material, applying a resin material to the reinforcement material, partially curing the resin material to form a partially cured resin material that binds the reinforcement material and has a tacky surface, coating the tacky surface of the partially cured resin material with pigment particles to produce a pigment coated partially cured resin material, wherein the pigment particles impart the spectral characteristic, and curing the pigment coated partially cured resin material to form a finished composite material comprising a matrix material that binds the reinforcement material, wherein the matrix material provides durability to the pigment particles coating the reinforcement material. A fluidized bed of the pigment particles may be used in the step coating the tacky surface of the partially cured resin material with pigment particles. A textured tool surface may be applied to the pigment coated partially cured resin material. The finished composite material may be sanded. Reinforcement materials include glass, carbon, organic fiber material made from poly-paraphenylene terephthalamide sold by DuPont® under the trade name Kevlar®, and organic fiber material made from from polyethylene sold by Honeywell® under the trade name Spectra®, among others. Pigments include metal flakes, inks, dyes, and pigment-coated microspheres, among others. Resins include vinyl ester resins and epoxy resins, among others.

In yet another embodiment, the invention includes a composite material with a spectral characteristic comprising: a reinforcement material, a layer of pigment particles, wherein the pigment particles impart the spectral characteristic, and a layer of resin material; wherein the layer of pigment particles is applied in a fluidized bed of pigment particles, and the resin material is cured to form a matrix that binds the reinforcement material and provides durability to the layer of pigment particles. The layer of resin material may be applied to the reinforcement material, and the layer of pigment particles is applied to the layer of resin material. Alternatively, the layer of pigment particles may be applied to the reinforcement material, and the layer of resin material may be applied to the pigment particle coated reinforcement material. A textured tool surface may be applied to the layers of pigment and resin before the resin is cured.

DETAILED DESCRIPTION OF THE INVENTION

The invention provides methods for imparting desired spectral characteristics to the surfaces of composite materials by imbedding active pigments directly into the surface of a composite such as a fiber reinforced composite laminate. The methods can be used on a wide variety of composite materials, including many types of reinforcement materials and many types of matrix materials. The methods of the invention have been successfully used with matrix materials including, for example, vinyl ester resins Derakane 8084 (Dow), Derakane 510A-40 (Dow), KO18 (AOC) and epoxy resins such as EPON 815C/Versamid 150 (Shell). The methods of the invention have been successfully used with reinforcement materials including 1583 Style E-Glass (Hexcel), S2-Glass Woven Rovings (FMI), 4060 Style Carbon (FMI), 4988 Style Kevlar (FMI) and others. Furthermore, the methods can be used with many types of pigments, including visible and infrared pigment particles and pigment-coated microspheres, including, for example, GL-0252 (Mo-Sci), 3M59 (3M), 3M61 (3M), Stainless Steel Flakes (Novamet), Oxidized Nickel Flakes (Novamet), VIR-1 (Sigma Labs), 264-8142 (Sun Chemical), 272-6123 (Sun Chemical), 34K6 (Johnson Matthey), 34E30 (Johnson Matthey), 34P2 (Johnson Matthey), and others. It will be evident to those skilled in the art that the methods of the invention may be used with the above mentioned materials as well as others.

In one embodiment, the invention includes a method in which pigment particles are applied to pre-impregnated (prepreg) composite materials. Prepreg materials comprise fiber reinforcement impregnated with resin and partially cured, forming a thin, tacky roll of material. The tacky surface of the prepreg provides an adhesive quality that facilitates coating with pigment particles. After coating with pigment, the prepreg may be fully cured. It has been found that prepreg materials thus coated have a durable color finish. Examples of prepregged epoxy resins on which the methods of the invention have been successfully employed include MXB7780/1583 (ICI-Fiberite) and CYCOM 5920/1583 (Cytec).

In another embodiment, the invention includes a method in which pigment particles are applied to non-impregnated reinforcement materials, such as fibers. The pigment-coated reinforcement materials are then subjected to normal composite production steps, including impregnating with resin and curing. The step of coating reinforcement materials with pigment can be facilitated by using electrostatic technology. Tackifiers or chemical treatments may be used to facilitate coating of non-conductive materials such as fiberglass.

In another embodiment, the invention includes a method in which pigment particles are applied to matrix materials, such as thermosetting resin materials. A composite material is fabricated using known techniques, then partially cured to form a B-stage resin, characterized by a softened, tacky resin. The B-stage resin may be coated with pigment particles then fully cured to form a durable pigmented coating.

In a preferred embodiment, the step of coating prepregs, reinforcement materials, or matrix materials may be carried out in a fluidized bed. It should be noted that any method of coating prepregs, reinforcement materials, or composites with pigment particles may be used in the methods of the invention. However, the embodiments using a fluidized bed reactor for the coating step are preferred because fluidized bed reactors provide a uniform coat of pigment particles whose density and thickness are easily controllable, and because they are adaptable to automated manufacturing.

Fluidized bed reactors are common in chemical processes for providing a fluid cloud of catalyst particles by balancing fluid flows, particle diameters, and reactor geometries to balance the buoyant force on the particles with the downward gravitational force. Fluidized bed reactors can allow manipulation of a number of process parameters, for example, air pressure, air flow, air temperature, electrostatic voltage, and mechanical vibration of the particle bed. The reactors thus provide random dynamic motion of catalyst particles in a controlled environment.

The inventors have found that fluidized bed reactors can beneficially be used to coat the composites in the methods of the invention by creating a cloud of pigment particles and passing the composites through the cloud. Process parameters such as air pressure, air flow, electrostatic voltage, and mechanical vibration can be adjusted to generate a fluid-like motion of the pigment-particle cloud and to adjust the properties of the cloud. Typical ranges for these process parameters can be, for example, 0–60 psi, 0–400 scfm, 75–150° F., 0–80 kV, and relative vibrations intensity 1–10. An example of a starting point for these parameters could be, for example, 45 psi, 120 scfm, 55 kV, and vibration intensity 3. Air temperature may be adjusted if the material to be coated is heat sensitive (e.g., prepreg or meltable polymer matrix or reinforcement) to increase the tack of the material and facilitate pigment adherence. In such an application, the air temperature can be in the range of 100–150° F., for example, or 100–120° F. The optimal temperature depends on the resin system and how inherently tacky it is. It has been found that the prepreg used in the examples described herein are beneficially coated at or below 120° F., but higher temperatures may be preferable for older materials or materials that are not as tacky.

Figure 1:
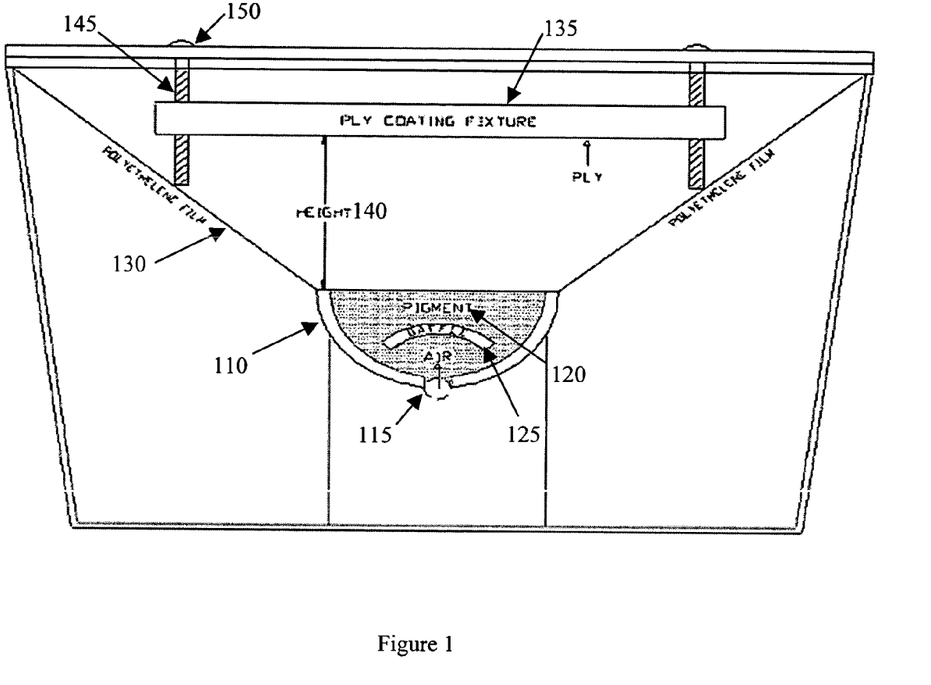
FIG. 1 is an example of a fluidized bed reactor that may be used in the methods of the invention.

FIG. 1 provides an illustration of a fluidized bed reactor that may be used with the present invention. The features of the fluidized bed reactor described here are not necessary to practice the claimed invention, but rather are discussed simply to show the details of the reactor that was used in the examples provided below. A polyethylene container 110 for the pigment particles 120 includes an inlet 115 for pressurized gas and a baffle 125 to guide the pressurized gas from the inlet 115. The sloped sides 130 of the containment area are constructed of polyethylene film sealed to the rim of the polyethylene container 110 and the reactor bed. The reactor includes a fixture 135 for mounting the article to be coated within the reactor. The height 140 of the fixture above the container 110 is adjustable using four bolts 145 attached to the lid of the reactor 150. Pressure vent holes machined into the lid of the reactor are fitted with 5 micron filter pads to allow pressure release and facilitate pigment containment. The details of construction and operation of the reactor are not critical; any fluidized bed reactor that can create a cloud of the pigment particles needed for any particular application would suffice.

Fluidized bed reactors may be used with a variety of pigment types and sizes. For example, spherical pigments ranging from 1–150 μm in diameter have been successfully tested in the methods of the invention, with 20–75 μm being preferred. Flake pigments successfully tested in the methods of the invention typically had aspect ratios of at least 100:1 and were between 50–100 μm in length. Even greater ranges of pigment sizes may be used in fluidized bed reactors, with the lower end of the range limited by the ability to filter the particles from the surrounding air and the upper end of the range limited by the ability to generate a particle cloud from bigger, heavier particles. The lower and upper ends of the range of sizes of pigment particles that can be used to coat materials according to the methods of the invention in a fluidized bed are thus dictated by the performance of a given fluidized bed reactor.

The fluidized bed coating approach allows flexibility in the coating process to accommodate different levels of tack in the prepreg or reinforcement materials, different pigments, different pigment coating density and thickness, and different deposition rates. Also, the fluidized bed approach may be easily adapted for use with electrostatic deposition of pigment particles on the reinforcement substrate, and with tackifiers or other chemical treatment for improving adherence to non-conductive reinforcement substrates.

Figure 2:
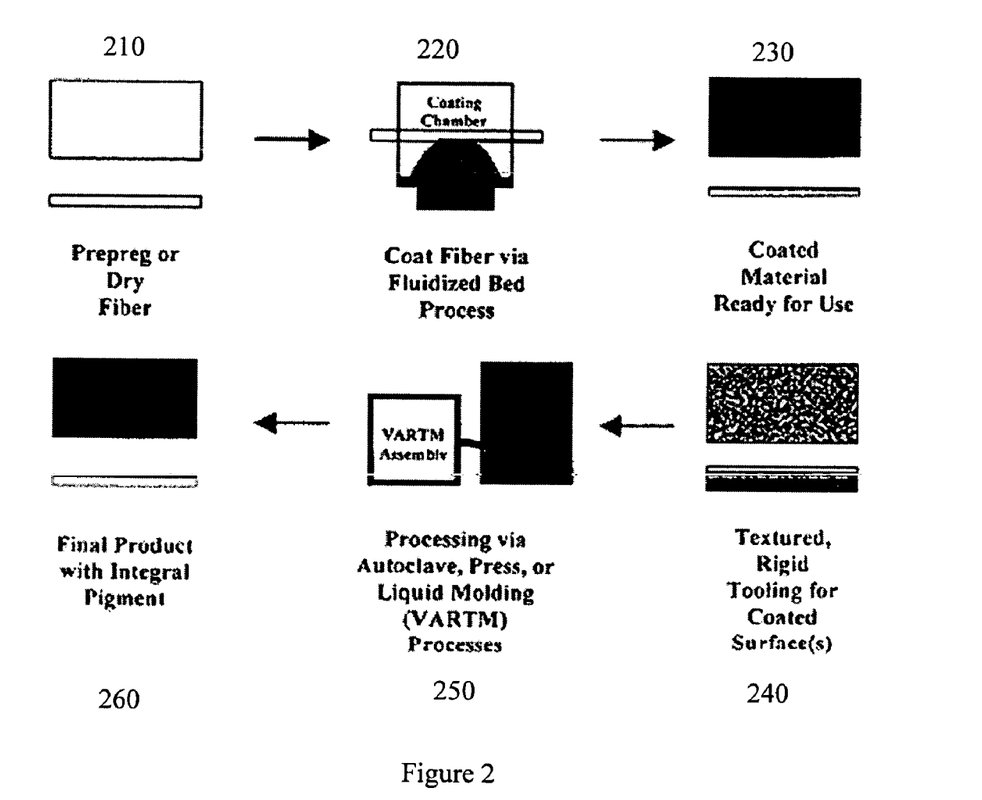
FIG. 2 is an outline of the steps of one of the methods of the invention.

FIG. 2 shows a schematic outline of one method of the invention. In step 210, a starting material, either a prepreg or a reinforcement material such as a dry fiber material, is provided. In step 220, the starting material is coated with pigment, preferably in a fluidized bed process. In step 230, the pigment-coated prepreg or reinforcement material is ready for use in any composite manufacturing process. In step 240, tooling is provided for composite manufacturing. In a preferred embodiment, the tooling is textured for a low-gloss finish, and is rigid in order to provide a desired reflectivity or emissivity. In step 250, the pigment-coated prepreg or reinforcement material is processed in any composite-forming process, such as autoclave, press, or liquid resin molding processes to produce a final composite product 260 with durable integral pigmentation.

Figure 3:
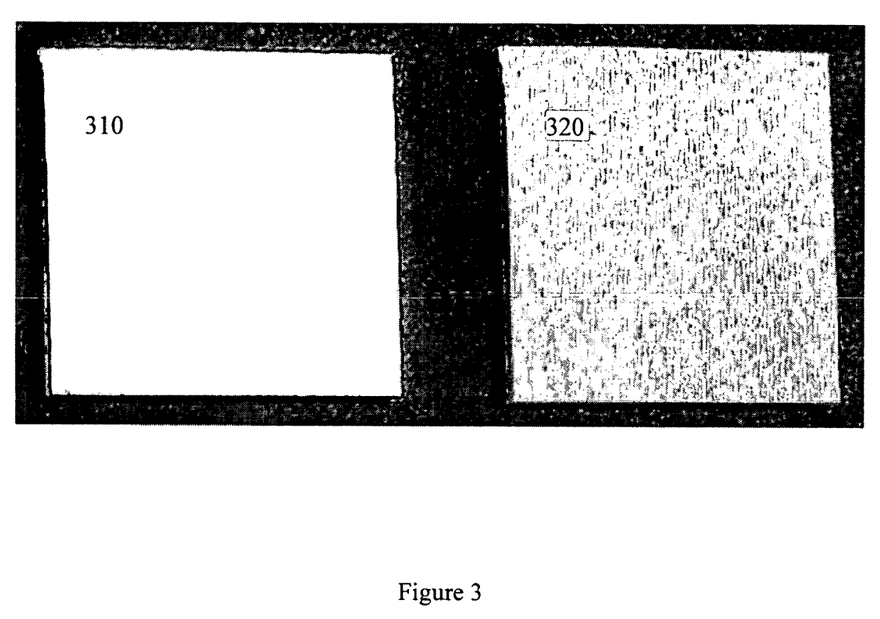
FIG. 3 is a comparison of composite materials of the invention, produced with and without a release film.

Coated reinforcement structures or prepreg materials can be further processed into composite material products using conventional techniques, such as resin infusion techniques including RTM and VARTM, or techniques using an autoclave or press, for example. It has been found that many factors affect the quality of the surfaces of composites made using the methods of the invention. The reflectivity and gloss of composite surfaces are significantly influenced by the surface texture of the tool, caul plate, mould, or other processing aid such as a release film (peel ply). FIG. 3 shows the difference between the surfaces produced using a method of the invention including applying stainless steel flakes then processed using VARTM with (310) and without (320) a peel ply. Textured tool surfaces can be used to impart particular desired surface features, such as a low-gloss finish. In a preferred embodiment, a textured caul plate may be used to create a highly reflective but low gloss finish.

Consolidation with a rigid tool surface against the coated part may be required to orient the pigment particles to achieve a desired reflectivity or emissivity. It has also been found that the use of an intermediate peel ply, release fabric, or other such layer tended to degrade reflectivity, and so such a layer is preferably not used where highly reflective surfaces are desired. Additionally, the average distance between the pigmentation layer and the surface of the finished part influence the thermal and visual properties of the surface finish, and the abrasion resistance and environmental durability of the coating.

EXAMPLES

Example 1

Two samples of composite materials were made in accordance with a method of the invention, by coating prepreg (MXB7780/1583) with stainless steel flake pigment particles, the first having a pigment coating thickness of 0.0004 inches, and the second having a pigment coating thickness of 0.0008 inches. The samples were then autoclave cured on a textured tool surface.

These samples were compared to composite samples that had been coated with pigment coatings using prior art methods. One prior art method, chemical agent resistant coating (CARC) was employed on a first comparative sample. CARC is a standard coating system, often used in military applications for a wide variety of vehicles, ships, and aircraft. A steel plate was sprayed with one layer of standard CARC primer and paint. Another prior art method, appliqué, was employed on a second comparative sample. The appliqué sample was fabricated by sputter coating active pigments on Kapton™ film (a standard aerospace technique for producing appliqué spectral coatings). The results of the comparison are presented below in Table 1.

TABLE 1

Performance goal and measured results relative to prior art coatings

| Sample Identification | Coating Thickness (in) | Surface Emissivity (2–12 μm) | Surface Gloss (at 45°) | Abrasion Resistance (cycles) |
|---|---|---|---|---|
| Goal | <0.0015 | 0.6 | <5 | 2000+ |
| CARC | 0.0030 | 0.95 | <3 | 2000 |
| Applique | 0.0015 | 0.4–0.8 | 3–10 | <250 |
| Integral Pigment | 0.0004 | 0.5–0.7 | <5 | 1500 |
| Integral Pigment | 0.0008 | 0.5–0.7 | <5 | 3000 |

In each case, the integral pigment coatings of the invention were superior to the Applique coatings in durability, with comparable surface emissivity, but with a much thinner coating. The thicker (0.0008 inch) integral pigment coating of the invention demonstrated superior durability to both the CARC or Applique coatings.

Figure 4A:
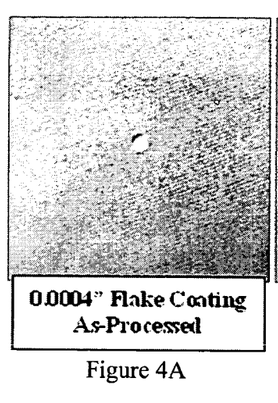
FIG. 4 is a demonstration of the abrasion resistance of the pigment coatings applied with the methods of the invention.
Figure 4B:
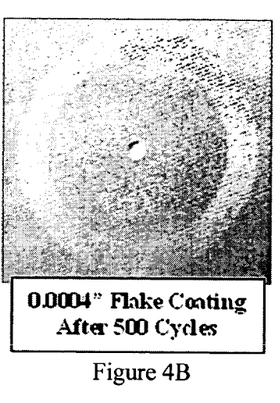
Figure 4C:
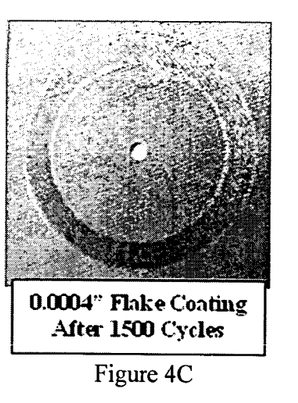
Figure 5:
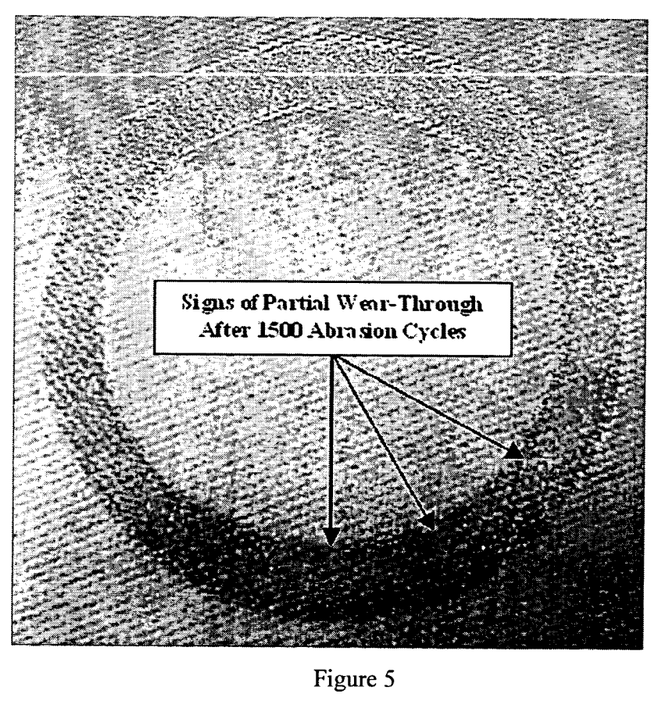
FIG. 5 is a demonstration of the abrasion resistance of the pigment coatings applied with the methods of the invention.

The durability of the thinner (0.0004 inch) coating is demonstrated in FIGS. 4 and 5. FIG. 4A shows the flake coating as processed. FIG. 4B shows the coating after 500 abrasion cycles. FIGS. 4C and 5 show the coating after 1500 abrasion cycles. Only after 1500 cycles do signs of partial wear through the coating appear (FIG. 5), thus demonstrating the superior durability of the coating.

Examples 2–19

Eighteen prepregged epoxy samples of either MXB7780/1583 (ICI-Fiberite) or CYCOM 5920/1583 (Cytec) were coated in a fluidized bed with various pigments, Novamet stainless steel flakes, treated Novamet (oxidized/heat treated) nickel flakes, and Sigma Lab pigment coated glass microspheres. The prepregs were passed through the fluidized bed for 1–3 passes to apply 1–3 pigment coatings. Post-coating processing included a vacuum layup with a peel ply, release film, or a textured tool to produce various surface finishes. Every one of the samples exhibited high quality reproducible coatings. Post-processing surface preparation comprised either no treatment, or 1–3 sanding passes. Table 2 summarizes some of the various types of materials, pigments, surface prep, and surface finishes achievable with the methods of the invention.

TABLE 2

Fluidized Pigment Bed Coated Prepreg

| Example | Material | Surface Prep | Pigment | # Coatings | Surface Finish |
|---|---|---|---|---|---|
| 2 | 7780/1583 | None | Novamet | 1 | Release Film |
| 3 | 7780/1583 | 3 Sanding Passes | Novamet | 1 | Release Film |
| 4 | 7780/1583 | 1 Sanding Pass | Novamet | 1 | Release Film |
| 5 | 7780/1583 | 3 Sanding Passes | Novamet | 1 | Peel Ply |
| 6 | 7780/1583 | 1 Sanding Pass | Novamet | 1 | Peel Ply |
| 7 | 7780/1583 | None | Novamet | 1 | Peel Ply |
| 8 | 7780/1583 | 1 Sanding Pass | Novamet | 1 | Release Film |
| 9 | 5920/1583 | 1 Sanding Pass | Novamet | 1 | Release Film |
| 10 | 7780/1583 | None | Novamet | 1 | Textured Tool |
| 11 | 7780/1583 | None | Novamet | 2 | Textured Tool |
| 12 | 7780/1583 | None | Novamet | 3 | Textured Tool |
| 13 | 5920/1583 | None | Novamet | 2 | Textured Tool |
| 14 | 5920/1583 | None | Novamet | 1 | Textured Tool |
| 15 | 5920/1583 | None | Novamet | 1 | Textured Tool |
| 16 | 5920/1583 | None | Sigma Lab | 1 | Textured Tool |
| 17 | 5920/1583 | None | Sigma Lab | 1 | Textured Tool |
| 18 | 5920/1583 | None | Treated Novamet | 1 | Textured Tool |
| 19 | 5920/1583 | None | Treated Novamet | 1 | Textured Tool |

Example 20

To reduce the gloss of prepreg surfaces coated with pigments using the methods of the invention, textured tool surfaces were prepared. Textured finishes were applied to the surfaces of four 0.125 inch thick aluminum caul plates. The surfaces of the caul plates were grit blasted with several different abrasives. The preferred finish was created using 6100 grit $Al_2O_3$ powder at 60 psi. The treated surfaces were cleansed with solvent and released with FREEKOTE 44NC mold release. Pigment coated prepreg plies (MXB7780/1583) were layed up directly onto the textured tool aluminum caul plates, then were autoclave cured. The resulting composite surfaces were found to be highly reflective, yet exhibited low gloss.

Example 21

Several composite materials were prepared using the methods of the invention to integrate Novamet Stainless Steel Flakes (infrared pigment) into MXB7780/1583 prepreg with post-coating processing including vacuum layup with and without a peel ply or using a textured tool surface in an autoclave. In order to determine the average distance from the material surface to the pigment layer, microscopic investigations were conducted on sections of the materials.

Figure 6A:
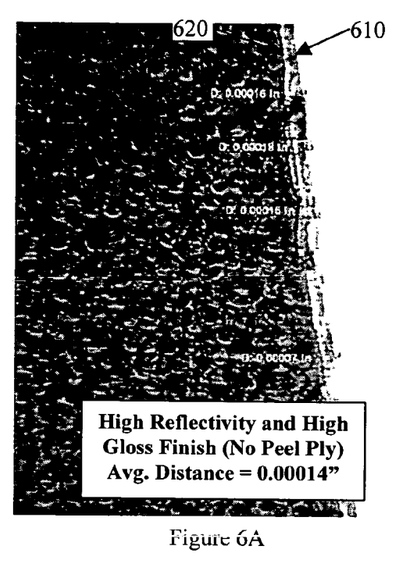
FIG. 6 is a comparison of composite materials of the invention, produced with and without a peel ply.
Figure 6B:
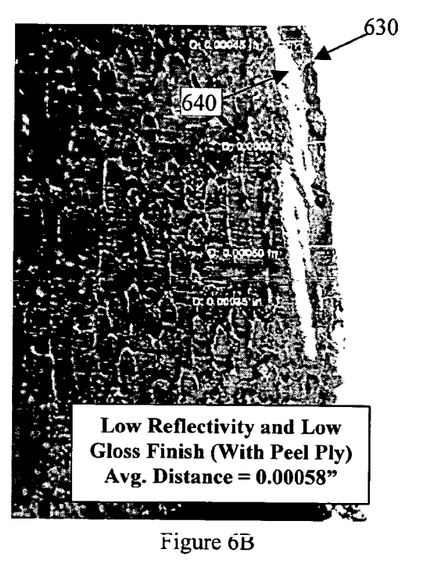
Figure 7A:
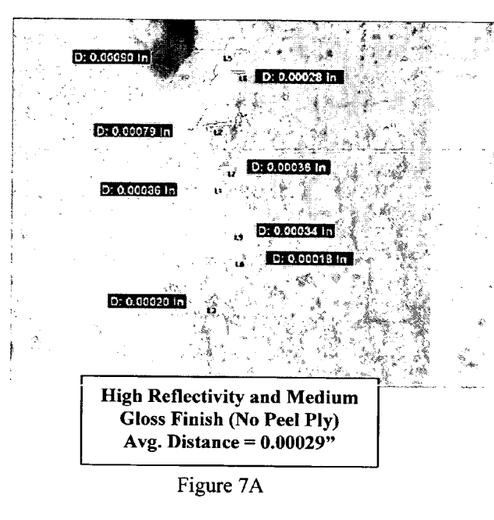
FIG. 7 is a comparison of composite materials of the invention produced with and without a peel ply, and with surface sanding.
Figure 7B:
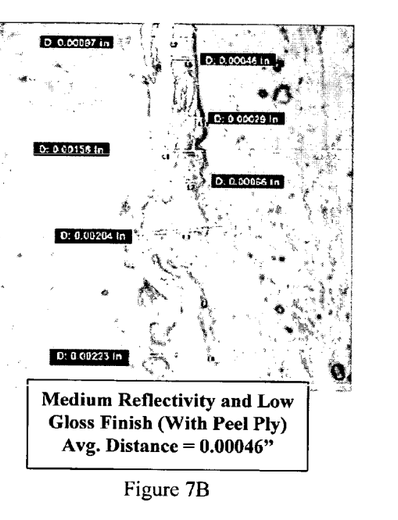
Figure 8:
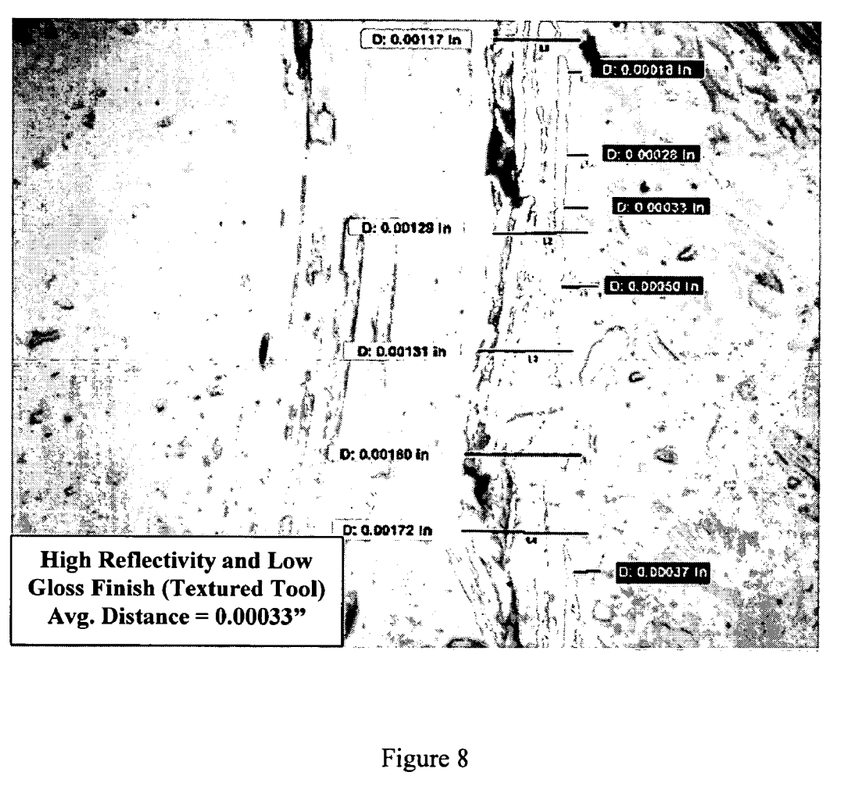
FIG. 8 shows a preferred composite material of the invention produced with a texturized tool.

FIG. 6A shows a 500× micrograph of a high reflectivity, high gloss composite surface prepared using the method of the invention involving a fluidized bed to coat prepreg with infrared pigment, followed by vacuum layup processing with no peel ply. The average distance between the surface 610 and the pigment layer 620 is 0.00014 inches in FIG. 6A. FIG. 6B shows a 500× micrograph of a low reflectivity, low gloss composite surface prepared using the method of the invention involving a fluidized bed to coat prepreg with infrared pigment, followed by vacuum layup processing with a peel ply. The average distance between the surface 630 and the pigment layer 640 is 0.00058 inches in FIG. 6B. FIGS. 7A and 7B show 500× micrographs of composites prepared the same way as those in FIG. 6, except that after the vacuum layup with (7B) and without (7A) a peel ply, three passes with 600 grit sandpaper on a high speed orbital sander buffed the surfaces. The average distances between the composite surface and the pigment layer was 0.00029 inches in FIG. 7A, and 0.00046 inches in FIG. 7B. FIG. 8 shows a 500× micrograph of a composite prepared with a preferred post-coating method using a textured tool surface to create a high reflectivity, low gloss finish. The average distance between the composite surface and the pigment layer was 0.00033 inches.

The amount of resin on the exterior side of the pigment layer decreases the reflectivity and gloss of the surface. Thus, if reflectivity and gloss are important parameters for a particular application, controlling the thickness of the resin above the pigment layer is critical. Secondary surface preparation such as sanding (FIG. 7) had some effect on the thickness of the surface resin layer, but may inconsistently affect the surface finish across larger areas, giving higher standard deviations along with the smaller average surface resin thickness. Textured tool plates (FIG. 8) provided a more uniform surface resin thickness and an acceptably thin average surface resin thickness.

Example 22

A reinforcement material comprising woven glass fabric is coated with a resin film then partially cured to form a B-stage resin film on the resulting composite. The B-stage resin film is then coated with pigment in a fluidized bed using heated air. Post-processing is done in a vacuum layup, with or without a peel ply, or using a textured tool surface in an autoclave.

Example 23

Figure 9A:
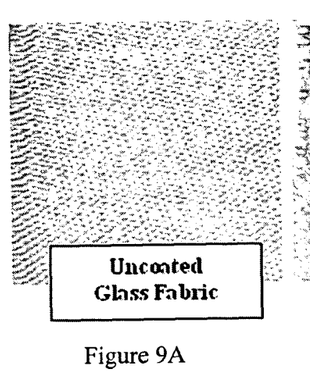
FIG. 9 shows the components of a composite coated with the methods of the invention before and after coating with pigment, and after resin infusion and curing.
Figure 9B:
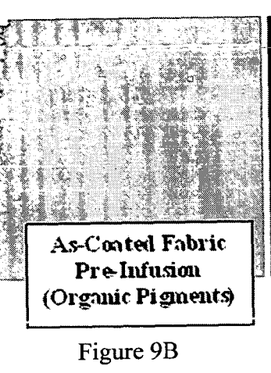
Figure 9C:
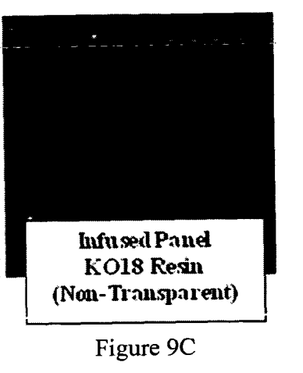

Woven glass fabric reinforcement material was coated with organic pigment particles in a fluidized bed, then infused with resin in a VARTM process and cured. FIG. 9A shows the untreated woven glass fabric. FIG. 9B shows the reinforcement material after it has been coated with organic pigment particles in a fluidized bed. FIG. 9C shows the composite material, after resin infusion and curing.

Example 24

Figure 10A:
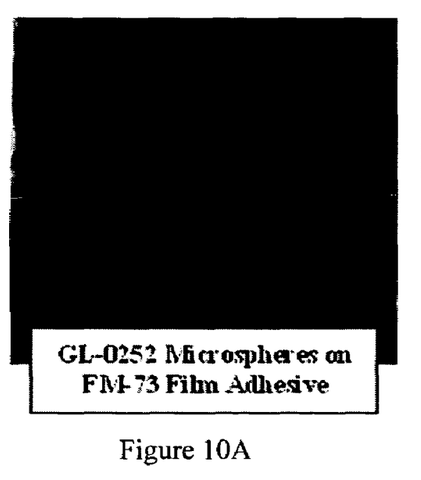
FIG. 10 shows an examples of composite materials made using an alternative method of the invention involving coating a film adhesive with pigment, applying the film to prepreg, and co-curing the film and prepreg.
Figure 10B:
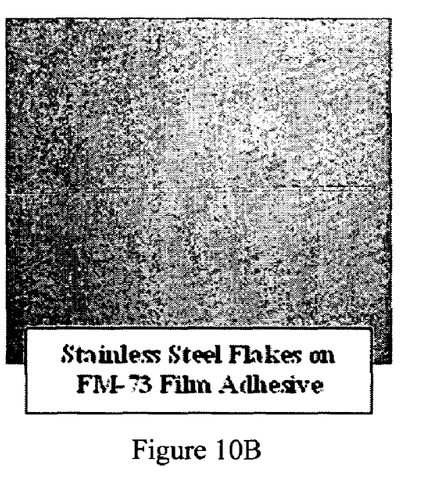

FM-73 film adhesive was coated with GL-0252 pigment bearing microspheres (FIG. 10A) or stainless steel flakes (FIG. 10B) in a fluidized bed. The adhesive was then applied to the surface of a prepreg panel, and co-cured with the prepreg panel. The spectral properties of the resulting composite were found to be adequate, although inferior to the spectral properties of composites directly coated with pigment, as in the preceding examples.

While the invention has been described in combination with embodiments thereof, many alternatives, modifications, and variations will be apparent to those skilled in the art in light of the foregoing description. Accordingly, the invention is intended to embrace all such alternatives, modifications, and variations as fall within the spirit and broad scope of the appended claims. All patent applications, patents, and other publications cited herein are incorporated by reference in their entirety.

I claim:

1. A method for imparting a spectral characteristic to a composite material, comprising the steps:
   (a) providing a reinforcement material,
   (b) coating the reinforcement material with pigment particles to produce a pigment coated reinforcement material,
   (c) applying a resin material to the pigment coated reinforcement material, and
   (d) curing the resin material to form the finished composite material comprising a matrix that binds the reinforcement material,
wherein the matrix material provides durability to the pigment particles coating the reinforcement material, and wherein the pigment particles impart the spectral characteristic to the composite material.

2. The method of claim 1, wherein a fluidized bed of the pigment particles is used in the step of coating the reinforcement material with pigment particles.

3. The method of claim 1, further comprising applying a textured tool surface to the pigment coated reinforcement material, after the reinforcement material is coated with the pigment particles.

4. The method of claim 2, further comprising applying a textured tool surface to the pigment coated reinforcement material, after the reinforcement material is coated with the pigment particles.

5. The method of claim 2, further comprising sanding a surface of the finished composite material.

6. The method of claim 1, wherein the reinforcement material is selected from the group consisting of glass, carbon, organic fiber material made from poly-paraphenylene terephthalamide, and organic fiber material made from from polyethylene.

7. The method of claim 1, wherein the pigment is selected from the group consisting of metal flakes, inks, dyes, and pigment-coated microspheres.

8. The method of claim 1, wherein the resin is selected from the group consisting of vinyl ester resins and epoxy resins.

9. A method for imparting a spectral characteristic to a composite material, comprising the steps:
(a) providing a reinforcement material,
(b) applying a resin material to the reinforcement material,
(c) partially curing the resin material to B-stage to form a partially cured resin material that binds the reinforcement material and has a tacky surface,
(d) coating the tacky surface of the partially cured resin material with pigment particles to produce a pigment coated partially cured resin material, and
(e) curing the pigment coated partially cured resin material to form a finished composite material comprising a matrix material that binds the reinforcement material, wherein the matrix material provides durability to the pigment particles coating the reinforcement material, and wherein the pigment particles impart the spectral characteristic to the composite material.

10. The method of claim 9, wherein a fluidized bed of the pigment particles is used in the step of coating the tacky surface of the partially cured resin material with pigment particles.

11. The method of claim 9, further comprising applying a textured tool surface to the pigment coated partially cured resin material.

12. The method of claim 10, further comprising applying a textured tool surface to the pigment coated partially cured resin material.

13. The method of claim 10, further comprising sanding a surface of the finished composite material.

14. The method of claim 9, wherein the reinforcement material is selected from the group consisting of glass, carbon, organic fiber material made from poly-paraphenylene terephthalamide, and organic fiber material made from polyethylene.

15. The method of claim 9, wherein the pigment is selected from the group consisting of metal flakes, inks, dyes, and pigment-coated microspheres.

16. The method of claim 9, wherein the resin is selected from the group consisting of vinyl ester resins and epoxy resins.

* * * * *